(12) United States Patent
Hawwa

(10) Patent No.: US 6,807,332 B1
(45) Date of Patent: Oct. 19, 2004

(54) PIEZOELECTRIC ACTUATED OPTICAL SWITCH

(75) Inventor: Muhammad A. Hawwa, Fremont, CA (US)

(73) Assignee: Western Digital (Fremont), Inc., Fremont, CA (US)

(*) Notice: Subject to any disclaimer, the term of this patent is extended or adjusted under 35 U.S.C. 154(b) by 175 days.

(21) Appl. No.: 09/884,702

(22) Filed: Jun. 19, 2001

Related U.S. Application Data

(60) Provisional application No. 60/246,284, filed on Nov. 6, 2000.

(51) Int. Cl.[7] .............................................. G02B 6/26
(52) U.S. Cl. ...................................................... 385/18
(58) Field of Search ............................. 385/18, 14, 16, 385/17, 25, 27

(56) References Cited

U.S. PATENT DOCUMENTS

| | | | |
|---|---|---|---|
| 4,080,636 A | 3/1978 | Ravizza | |
| 4,169,276 A | 9/1979 | Rodal | |
| 4,775,815 A | 10/1988 | Heinz | |
| 5,043,043 A * | 8/1991 | Howe et al. | ............ 216/17 |
| 5,043,621 A | 8/1991 | Culp | |
| 5,235,472 A | 8/1993 | Smith | |
| 5,293,094 A * | 3/1994 | Flynn et al. | ........ 310/323.11 |
| 5,315,203 A | 5/1994 | Bicos | |
| 5,424,596 A | 6/1995 | Mendenhall et al. | |
| 5,466,985 A | 11/1995 | Suzuki | |
| 5,500,761 A | 3/1996 | Goossen et al. | |
| 5,552,658 A | 9/1996 | Dibbern et al. | |
| 5,558,477 A | 9/1996 | Browning et al. | |
| 5,589,974 A | 12/1996 | Goossen et al. | |
| 5,606,477 A | 2/1997 | Erpelding et al. | |
| 5,701,193 A | 12/1997 | Vogel et al. | |
| 5,739,945 A | 4/1998 | Tayebati | |
| 5,764,444 A | 6/1998 | Imamura et al. | |
| 5,786,655 A | 7/1998 | Okumura et al. | |
| 5,796,553 A | 8/1998 | Tangren | |
| 5,801,908 A | 9/1998 | Akiyama | |
| 5,825,528 A | 10/1998 | Goossen et al. | |
| D404,100 S | 1/1999 | Lazarus et al. | |
| 5,857,694 A | 1/1999 | Lazarus et al. | |
| 5,862,015 A | 1/1999 | Evans | |
| 5,867,202 A | 2/1999 | Knipe et al. | |
| 5,949,571 A | 9/1999 | Goossen et al. | |
| 6,020,674 A | 2/2000 | Zhang et al. | |
| 6,052,251 A | 4/2000 | Mohajerani et al. | |
| 6,100,623 A | 8/2000 | Huang et al. | |
| 6,157,522 A | 12/2000 | Murphy et al. | |
| 6,360,036 B1 * | 3/2002 | Couillard | ............. 385/19 |
| 6,362,556 B1 * | 3/2002 | Hoen | ............. 310/309 |
| 6,430,333 B1 * | 8/2002 | Little et al. | ............. 385/18 |
| 6,522,802 B2 * | 2/2003 | Hoen | ............. 385/18 |
| 6,535,663 B1 * | 3/2003 | Chertkow | ............. 385/18 |
| 2002/0018192 A1 * | 2/2002 | Nishi | ............. 355/53 |

OTHER PUBLICATIONS

Bishop, D., "Micromachines may solve lightweight network problems," Laser Focus World, Jan. 2000, p. 127.

Brown, C., "Mini laser scanners built with MEMS," EE Times, Issue 1007, May 18, 1998.

(List continued on next page.)

Primary Examiner—Frank G. Font
Assistant Examiner—Kevin Kianni
(74) Attorney, Agent, or Firm—Carr & Ferrell LLP

(57) ABSTRACT

An optical switching component comprises a rotor with a reflective top surface pivotally mounted within a stator, and a piezoelectric actuator set between the rotor and the stator to move the rotor about the pivot point. A controller can also be joined to the piezoelectric actuator to effectuate actuation thereof. Two light ports can also be set proximate to the reflective top surface such that a beam of light emitted from one is reflected to the other. Multiple optical switching components can be arranged to form an optical switching device. Optical switching components and devices can be fabricated according to conventional microfabrication practices including film deposition, planarization, and photolithography techniques.

13 Claims, 7 Drawing Sheets

OTHER PUBLICATIONS

De Rooij, N., "2×2 Fiber Optic Switch," The Sensors, Actuators and Microsystems Laboratory, Institute of Microtechnology, University of Neuchatel, Switzerland, <http://www-samlab.unine.ch/Activities/Projects/Optical_MEMS/2x3fiber.htm>.

Evans, R., et al. "Microactuation White Paper," Hutchinson Technology, Inc., pp. 1–7, Sep. 3, 1998.

Evans, R., et al., "Piezoelectric Microactuator for Dual Stage Control," APMRC, Singapore, Jul. 29–31, 1998.

Evans, R., et al., "Two-stage microactuator keeps disk drive on track," Components, pp. 43–44, Apr. 1998.

Guo, W., et al., "A High Bandwidth Piezoelectric Suspension for Hightrack Density Magnetic Data Storage Devices," APMRC, Singapore, Jul. 29–31, 1998.

Guo, W., et al., "Dual Stage Acutators for High Density Rotating Memory Devices," IEEE Trans. On Mag., vol. 34, No. 2, pp. 450–455, Mar. 1998.

Horsley, D., et al., "Dual Actuators Solve Track–Density Dilemma," Data Storage, pp. 17–20, Apr. 1999.

Imamura, T., et al., "Transverse Mode Electrostatic Microactuator for MEMS–Based HDD Slider," IEEE, pp. 216–221, Jun. 1996.

Koganezawa, S., et al., "A Flexural Piggyback Milli–Actuator for Over 5 GBit/in(2) Density Magnetic Recording," IEEE Trans. On Mag., vol. 32, No. 3, pp. 3908–3910, May 1996.

Koganezawa, S., et al., "Dual–Stage Actuator System for Magnetic Disk Drives Using a Shear Mode Piezoelectric Microactuator," APMRC, Singapore, Jul. 29–31, 1998.

Mori, T., et al., "A Dual–Stage Magnetic Disk Drive Actuator Using A Piezoelectric Device for a High Track Density," IEEE Trans. On Mag., vol. 22, No. 6, pp. 5298–5302, May 1996.

Nakamura, S., et al., "Application of Micromachine Technology to Hard Disk Drives," IEEE Trans. On Mag., vol. 34, No. 2, pp. 477–479, Mar. 1998.

Narasimha, S., et al., "Optical MEMS: Addressing Tomorrow's Telecom Needs," Fiberoptic Product News, Feb. 2001.

Sampsell, J., "An Overview of the Performance Envelope of Digital Micromirror Device (TM) (DMD) Based Projection Display Systems," 2001, Texas Instruments, <http://www.dlp.com/dlp/resources/tech_over.asp>.

Soeno, Y., et al., "Piezoelectric Piggy–back Microactuator for Hard Disk Drive," APMRC, Singapore, Jul. 29–31, 1998.

Takaishi, K., et al., "Microactuator Control for Disk Drive," IEEE Trans. On Mag., vol. 32, No. 3, pp. 1863–1866, May 1996.

Tang, W., et al., "Silicon Micromachined Electromagnetic Microactuators for Rigid Disk Drives," IEEE Trans. On Mag., vol. 31, No. 6, pp. 2964–2966, Nov. 1995.

Tang, Y., et al., "Micro Electrostatic Actuators in Dual–Stage Disk Drives with High Track Density," IEEE Trans. On Mag., vol. 32, No. 5, pp. 3851–3853, Sep. 1996.

Information sheet depicting "a TSA Magnum 5E," Hutchinson Technology, Inc., Sep. 17, 1999.

* cited by examiner

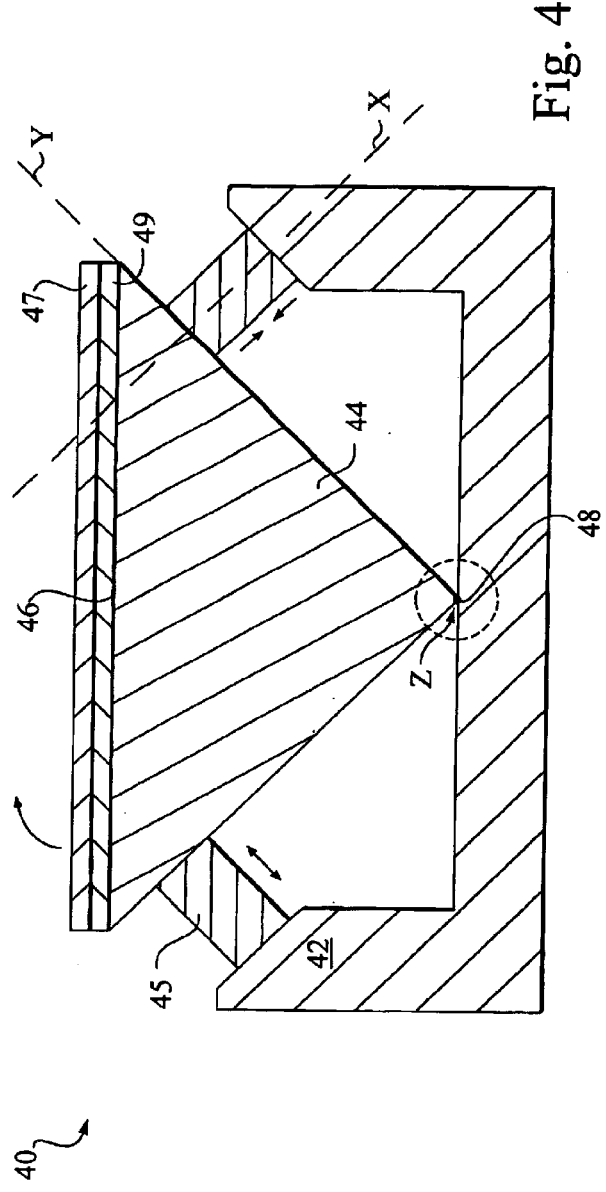
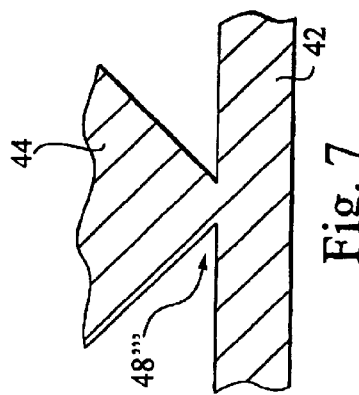
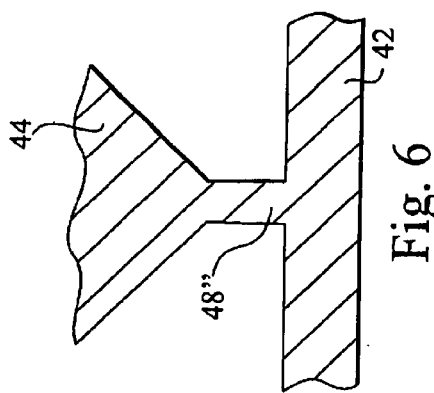
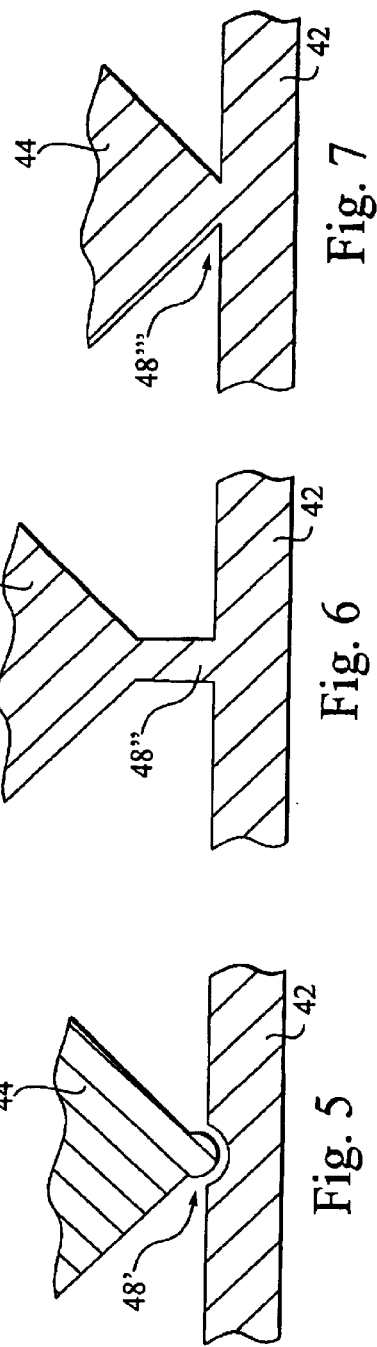
Fig. 4
Fig. 5
Fig. 6
Fig. 7

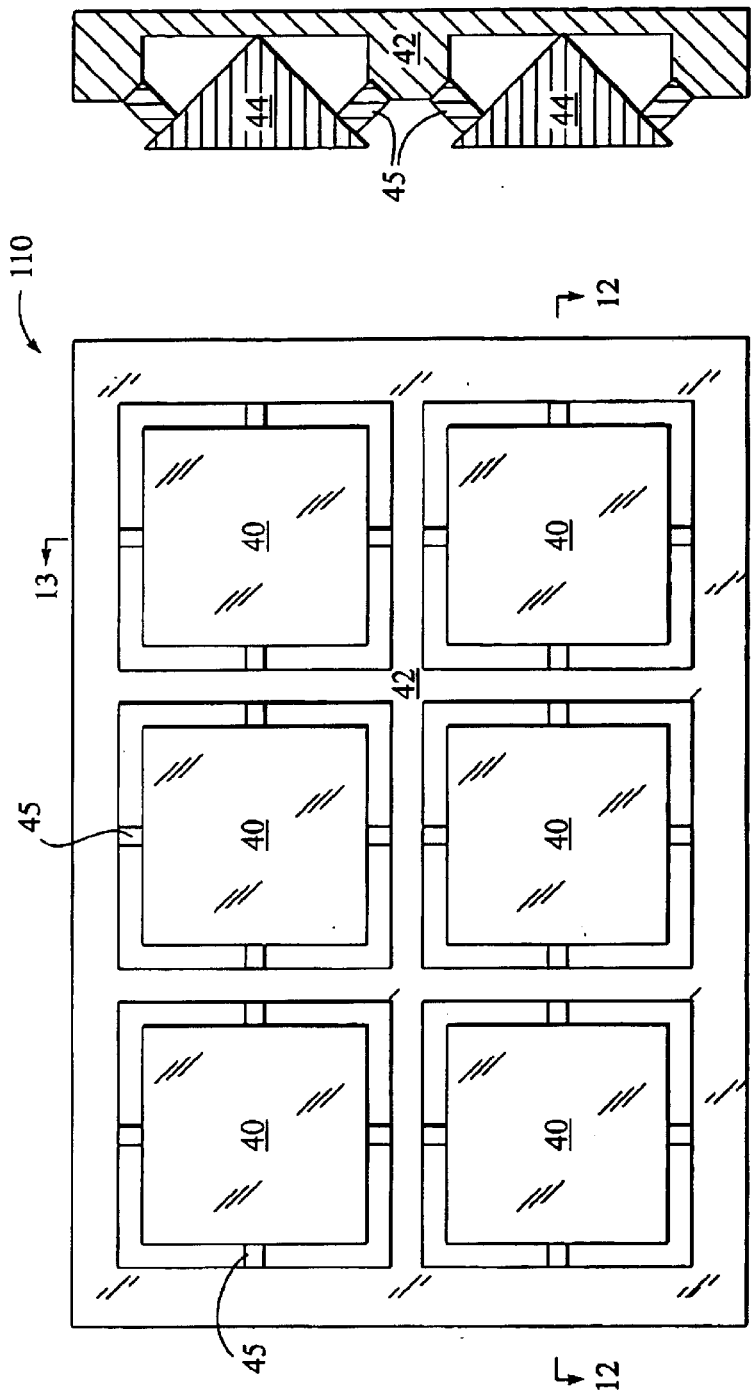
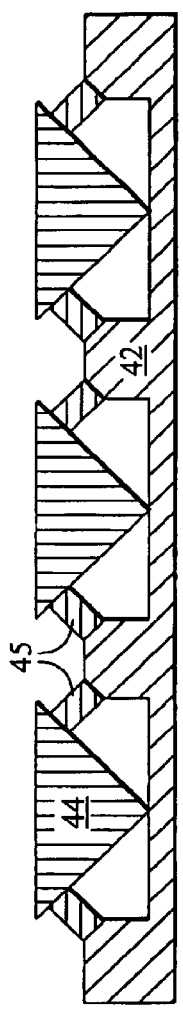
Fig. 11
Fig. 12
Fig. 13

PIEZOELECTRIC ACTUATED OPTICAL SWITCH

This application claims benefit of 60/246,284 filed Nov. 6, 2000.

BACKGROUND

1. Field of the Invention

The present invention relates generally to optical signal switching, and more particularly to a piezoelectric actuated device for switching an optical signal.

2. Description of the Prior Art

Optical data transmission offers many advantages over electrical and broadcast transmission, however, switching optical data from one channel to another has proven to be problematic. Fundamentally, a beam of light is unaffected by passage through an electric or magnetic gradient, thus the usual solid-state methods for switching electric signals are not effective to switch optical signals. Accordingly, various mechanical techniques relying typically on reflection or refraction have been developed to divert optical signals.

FIG. 1 is a schematic diagram of an optical switching array 10 of the prior art. The switching array includes input ports 12 and output ports 14 arranged in columns and rows. To switch an optical signal from the first input port 12 to the output port 14 fourth from the left in the drawing, a diverter 18 located at a point of intersection between the axes of the two ports 12 and 14, diverts the beam from the input port 12 to the output port 14. The diverter 18 can be a mirror, a light pipe, a refractive medium, or the like. Most diverters 18 require a form of actuation to move them into or out of the path of a light beam.

FIG. 2 shows a diverter 20 of the prior art. The diverter 20 is supported within a frame 22 by support members 24, typically arranged in pairs on orthogonal axes as shown. The diverter 20, frame 22, and support members 24 are typically all fabricated from a substrate of silicon. The support members 24 are made sufficiently thin so that the diverter 20 can be rotated within the frame 22 around axes defined by the support members 24. The top surface of diverter 20 is made highly reflective, sometimes by applying a coating, so that light can be reflected with the lowest possible loss of signal strength. FIG. 2 illustrates that as the diverter 20 is rotated simultaneously around both axes as shown, the top surface of the diverter 20 can be made to tilt in the direction 26 indicated. Accordingly, a light beam directed at diverter 20 can be reflected to any of a plurality of output ports 14 by appropriately tilting diverter 20.

FIG. 3 shows a cross-section of the device in FIG. 2 taken along the line indicated. The diverter 30 includes a base 32 suspended within frame 34. The base 32 includes a reflective coating 36. Between the frame 34 and the bottom of the base 32 is an interdigitated electrostatic actuator 37 comprising interdigitated fingers 38 and 39 of the base 32 and frame 34, respectively. The interdigitated electrostatic actuator 37 is actuated by applying electric charges to surfaces of fingers 38 and 39 to cause them to attract or repel. The electric charges can be applied to specific fingers 38 and 39, or to sets of fingers 38 and 39, to modify how much force is applied, and in what direction, to control the induced tilting of base 32.

Diverters 30 suffer several drawbacks, however. In addition to being expensive to produce, they are also sensitive to electrostatic discharges (ESD) and microcontamination. It will be readily appreciated that ESD can destroy the interdigitated electrostatic actuator 37 by melting or fusing fingers 38 and 39. Similarly, microcontamination in the form of fine particles or surface films, for example, can mechanically jam the interdigitated electrostatic actuator 37 and prevent it from actuating. Microcontamination can also create an electrical short between fingers 38 and 39, thereby preventing actuation.

A piezoelectric material is one that will develop an electric potential in response to mechanical deformation, and will mechanically deform in response to an applied electric potential. This is commonly known as the piezoelectric effect. Piezoelectric materials are used in a wide variety of applications including transducers, spark generators for butane lighters, and vibration damping.

Piezoelectric materials are typically either ceramic or polymeric. Common ceramic piezoelectric materials include quartz, cadmium sulphide, and titanate compounds such as barium titanate, lead titanate, and lead zirconium titanate (PZT). Common polymeric piezoelectric materials include polyvinylidene fluoride (PVDF), copolymers of vinylidene fluoride and trifluoroethylene (VDF/TrFE), copolymers of vinylidene fluoride and tetrafluoroethylene (VDF/TeFE), and copolymers of vinylidene cyanide and vinyl acetate (VDC/NA).

Accordingly, what is desired is an optical switching device that can redirect a beam of light between multiple ports and that is less susceptible to microcontamination and ESD failures, and that is readily fabricated according to developed microfabrication technologies.

SUMMARY

An optical switching component comprises a stator, a rotor pivotally connected to the stator and including a top surface, a first piezoelectric actuator coupled to the stator and the rotor and configured to pivot the rotor relative to the stator when actuated. Embodiments also can further comprise an optically reflective coating formed on the top surface, and a seed layer between the optically reflective coating and the top surface. Other embodiments further comprise additional piezoelectric actuators, such as two actuators connecting opposite ends of the rotor to the stator and configured to cooperatively pivot the rotor relative to the stator. Four actuators can also be employed where two of the four are configured to pivot the rotor relative to the stator around a first axis and the other two are configured to pivot the rotor around a second axis.

The use of piezoelectric actuators to translate the rotor relative to the stator is advantageous in that piezoelectric actuators are less prone to ESD damage than are electrostatic actuators. Further, when a voltage is applied across a piezoelectric material to create a certain strain, a relatively high amount of stress is developed. Thus, piezoelectric actuators are able to develop substantially more force to accelerate the mass of the rotor than can electrostatic actuators acting on diverters of the prior art. Accordingly, piezoelectric actuators can easily overcome the adhesive effects of microcontamination and thereby make the optical switching components of the present invention more tolerant of less clean environments.

Further embodiments of the optical switching component additionally comprise a controller in communication with the piezoelectric actuator. The controller is capable of applying a voltage to the actuator to cause it to expand or contract along an axis in response to an instruction to switch a beam. In so doing, the controller drives the actuator to orient the top surface of the rotor such that an angle of incidence of a emitted beam from a first port is substantially equal to an angle of reflectance of a reflected beam received by a second port. Further embodiments also comprise a detector in communication with the controller and capable of determining a signal strength of the reflected beam at the second port, the controller being capable of using the output of the detector as part of a feed-back loop in order to optimize the signal strength of the reflected beam at the second port.

The present invention also includes an optical switching device comprising an optical switching component, as provided above, and further comprising an emitter port and a receiver port. The emitter port defines a first line within a plane and is fixed proximate to the optical switching component such that the first line intersects the top surface at about a center thereof to define an angle of incidence between the first line and the top surface. Likewise, the receiver port defines a second line within the plane and is fixed proximate to the optical switching component such that the second line intersects the top surface at about the same point as the first line to define an angle of reflectance between the second line and the top surface.

Further embodiments of the optical switching device comprise a plurality of optical switching components of the present invention arranged in an array, a plurality of emitter ports, where each emitter port is associated with one of the plurality of optical switching components, and at least one receiver port associated with each optical switching component. Additional embodiments also include a controller in communication with multiple optical switching components and configured to drive the piezoelectric actuators of each of the multiple optical switching components. In this way a single controller can orient multiple optical switching components simultaneously.

The present invention also includes a method for switching an optical signal. The method comprises providing an optical switching device of the present invention, receiving an instruction at a controller, applying a voltage to a first piezoelectric actuator to orient a top surface of a rotor such that an angle of incidence is substantially equal to an angle of reflectance, and emitting a beam from an emitter port such that it reflects off the top surface and is received by a receiver port.

The present invention also includes a method for making an optical switching component. The method comprises providing a substrate, forming a stator by defining a cavity within the substrate, forming a mask layer over the stator and filling the cavity, forming an opening in the mask layer, forming within the opening a rotor and a pivotal connection to the stator, removing the mask layer, and forming a piezoelectric actuator between the stator and the rotor.

BRIEF DESCRIPTION OF DRAWINGS

The present invention is illustrated by way of example, and not by way of limitation, in the figures of the accompanying drawings and in which like reference numerals refer to similar elements and in which:

FIG. 4 is a cross-section of an optical switching component according to an embodiment of the present invention;

FIGS. 5–7 are cross-sections of alternative pivot connectors;

FIG. 11 is a top plan view of an optical switching device according to an embodiment of the present invention;

FIGS. 12 and 13 are cross-sections of the optical switching device of FIG. 11.

DETAILED DESCRIPTION OF THE INVENTION

Figure 1:
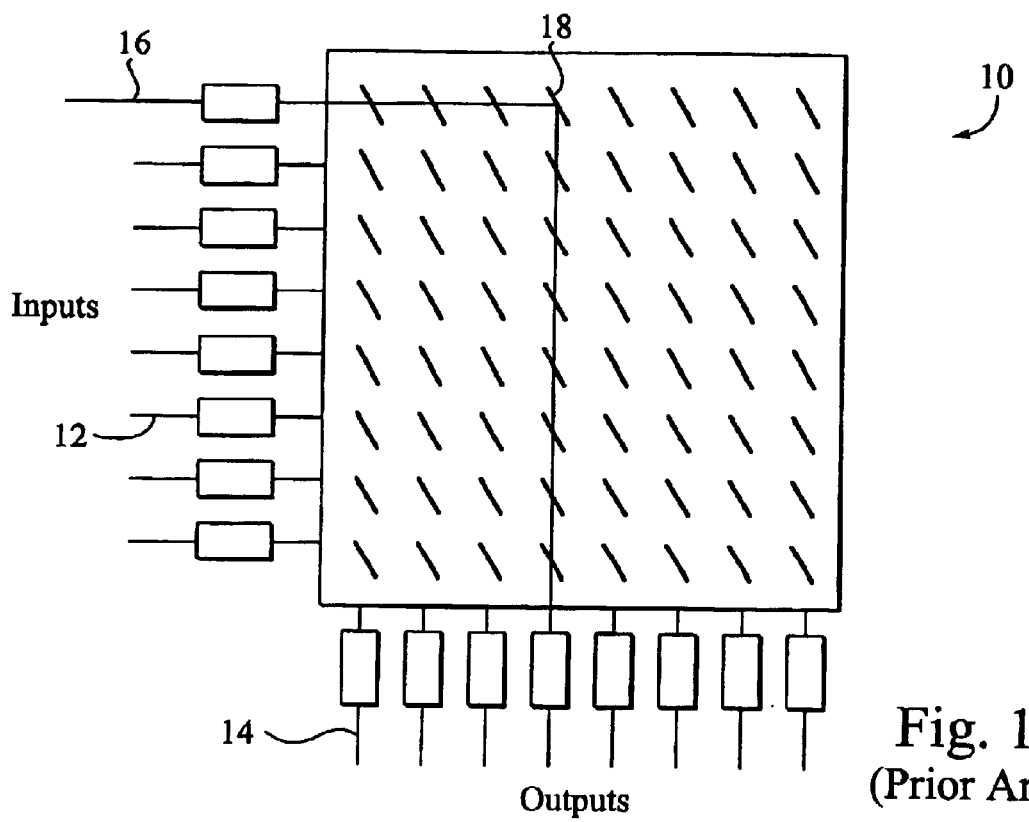
FIG. 1 is a schematic diagram of an optical switching array of the prior art.
Figure 2:
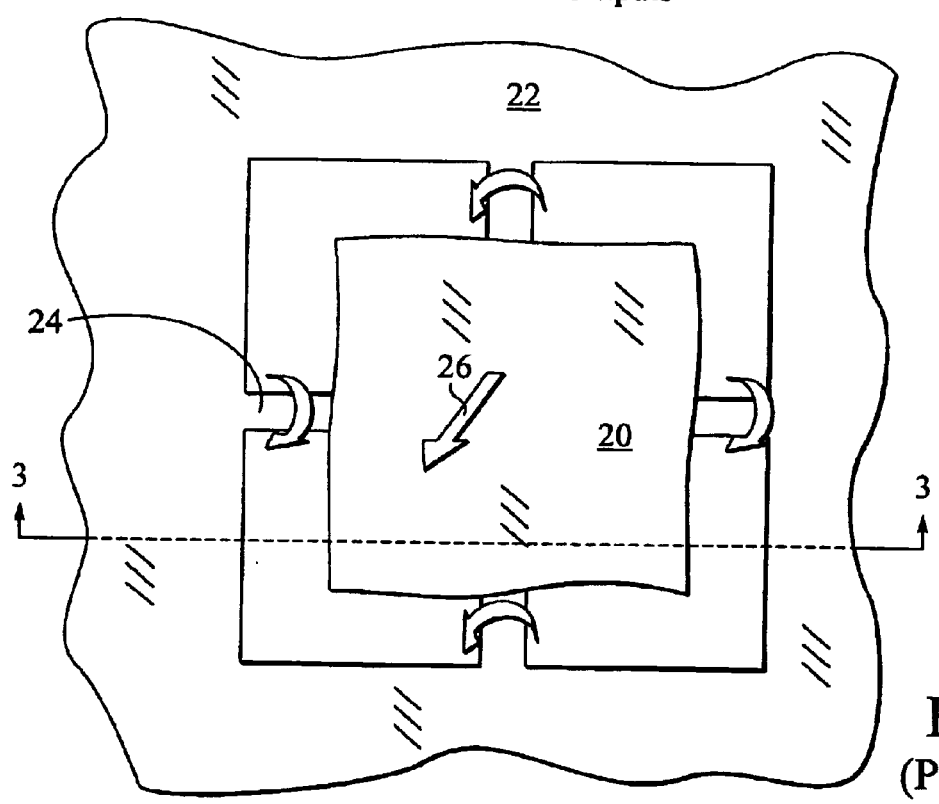
FIG. 2 is a top plan view of a diverter of the prior art.
Figure 3:
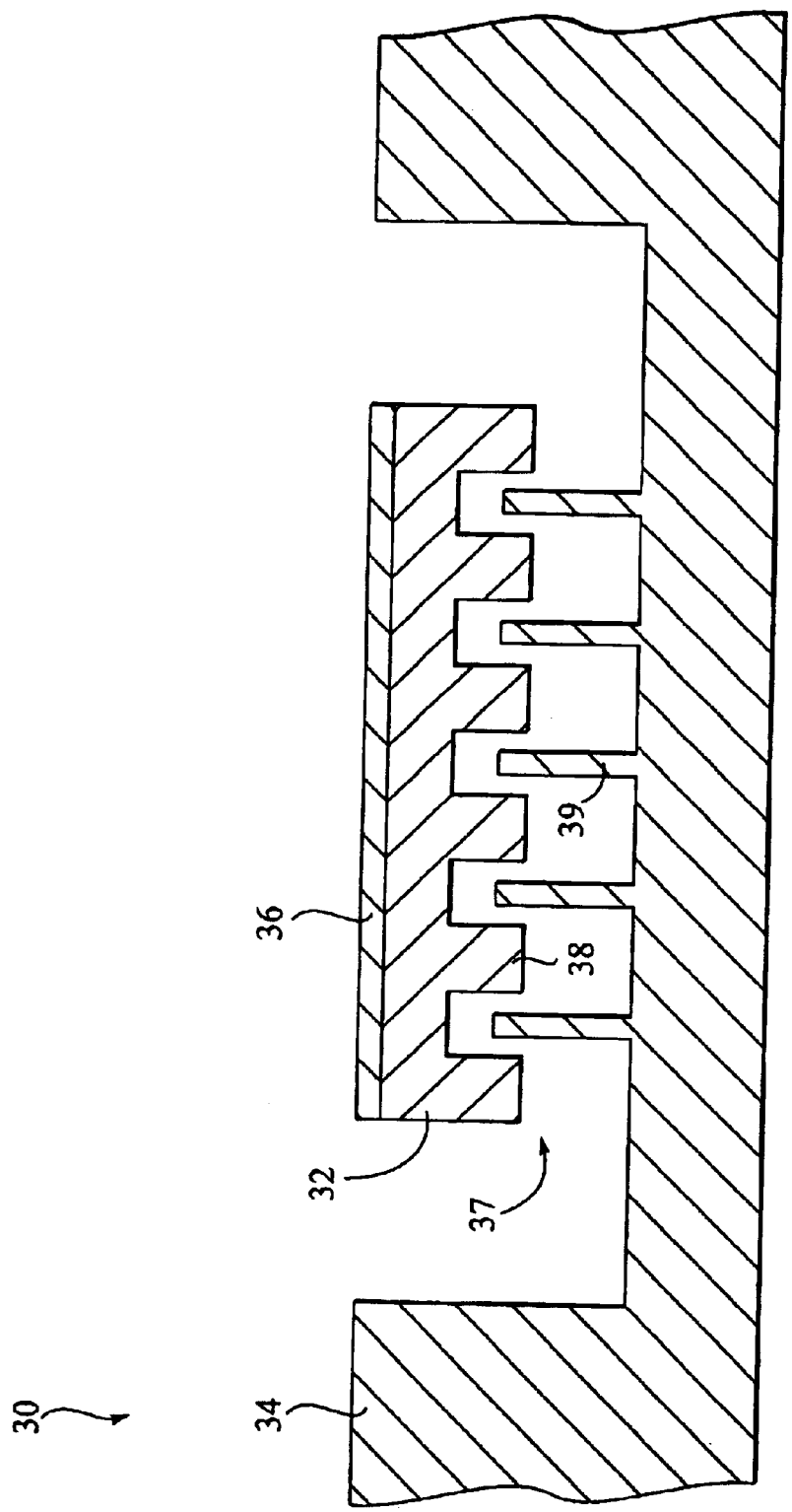
FIG. 3 is a cross-section of a diverter of the prior art.

FIG. 4 shows a cross-section of an optical switching component 40 according to an embodiment of the present invention. The optical switching component 40 comprises a stator 42, a rotor 44, and a piezoelectric actuator 45. The rotor 44 is pivotally connected to the stator 42 at a pivot connector 48. The piezoelectric actuator 45 is connected to the stator 42 and the rotor 44 and is configured to pivot the rotor 44 relative to the stator 42 when actuated.

Stator 42 is a support member intended to hold one or more rotors 44 in place. In preferred embodiments the stator 42 includes a cavity for each rotor 44. It will be appreciated, however, that an optical switching component 40 can be formed having a generally flat stator 42, for example. Stator 42 may be fabricated from almost any solid material having sufficient rigidity to provide a stable support, however, preferred materials additionally have superior cleanliness properties such as low particle yield and low outgassing, and are easily fabricated into complex shapes. Accordingly, both monocrystalline and polycrystalline silicon are generally preferred.

Rotor 44 is a movable component that can be oriented to reflect an optical beam to a target. Rotor 44 includes a substantially planar top surface 46. In some embodiments the material that forms the rotor 44 is optically reflective and the top surface 46 is sufficiently smooth that it can be used to reflect an optical beam to a target. Rotor 44 can be made of almost any solid material, however, it is desirable in some embodiments to fashion rotor 44 out of the same material as stator 42. In some embodiments it is desirable to form rotor 44 out of materials common to microfabrication techniques such as silicon, silicon dioxide, aluminum oxide, and the like.

In preferred embodiments an optically reflective coating 47 is formed on the top surface 46, and in firther embodiments a seed layer 49 is disposed between the optically reflective coating 47 and the top surface 46. It will be understood that even in those embodiments that comprise a reflective coating 47, it is generally desirable to make the top surface 46 smooth and substantially planar. Suitable materials for the reflective coating 47 will reflect a significant fraction of any incident light having the particular wavelength of the beam sought to be switched. Optically reflective coating 47 comprises gold in preferred embodiments.

Rotor 44 is joined to stator 42 by pivot connector 48. FIGS. 5–7 show three alternative embodiments for pivot connector 48. In one embodiment, FIG. 5 shows a cup and ball connector 48' in which the rotor includes a generally rounded ball portion configured to rotate within a socket formed in stator 42. In another embodiment, FIG. 6 shows a connector 48" which is a flexible strip of material joining stator 42 with rotor 44. In some embodiments connector 48" is integral with one or both of stator 42 and rotor 44. Connector 48" is not limited to any particular shape and thus can have a square, rectangular, or circular cross-section among others. FIG. 7 shows another embodiment in which stator 42 and rotor 44 are joined directly together at a flexible neck connector 48'41 that can also have any desired shape such as square, rectangular, or circular cross-section among others.

It should be noted that although the embodiments pictured in the various FIGS. all show a generally triangular rotor 44 joined by an apex to a point near the center of stator 42, one of skill in the art will readily appreciate that, following the same general principles, these elements can be configured in many other different ways. For example, the rotor 42 can take the form of a cantilever joined at one edge to stator 44 by a pivot connector 48, with the piezoelectric actuator 45 joining the opposite end of rotor 44 to the stator 42. Alternately, in the above example the cantilever rotor 44 can be supported at one end by pivot connector 48, much as a diving board, with the piezoelectric actuator 45 disposed beneath the rotor 44. In such an embodiment the actuator 45 would connect a bottom surface of rotor 44 to the stator 42.

Piezoelectric actuator 45, when actuated, pivots the rotor 44 relative to the stator 42 around an axis of rotation Z through pivot connector 48, perpendicular to the plane of the drawing in FIG. 4. The actuator 45 can be made of any suitable piezoelectric material, however, preferred embodiments will include lead zirconium titanate (PZT). The PZT can additionally be formed as a multilayered structure. The actuator 45 also defines an axis of deformation X in the direction in which it is configured to extend and contract. To maximize the angle through which the rotor 44 can be rotated by actuator 45, the actuator 45 should be oriented such that the axis of deformation is set approximately perpendicular to a line Y drawn normal to the axis of rotation so that the three axes are mutually orthogonal.

Figure 8:
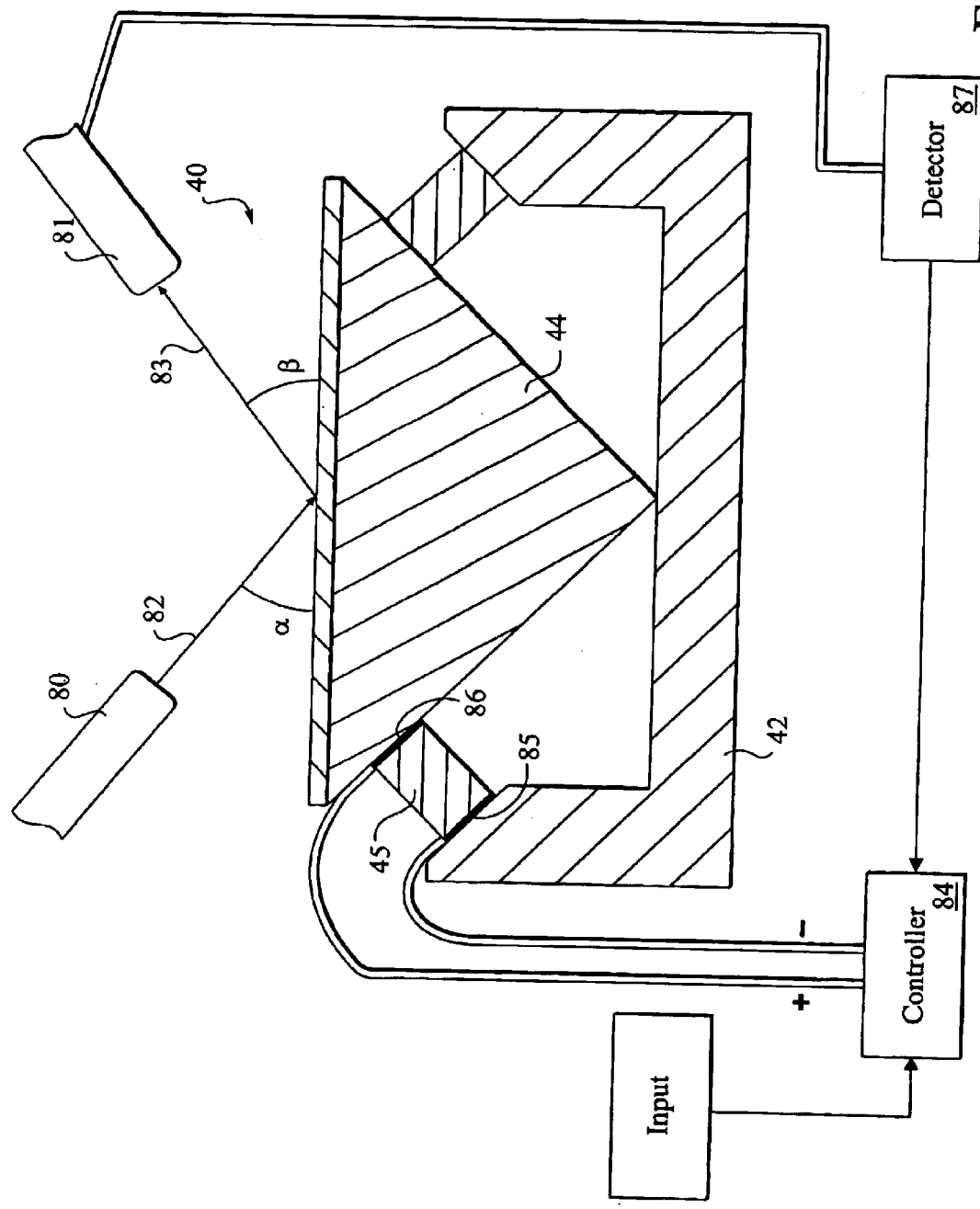
FIG. 8 is a cross-section of an optical switching device according to an embodiment of the present invention.

FIG. 8 shows an embodiment of the optical switching component 40 with an emitter port 80 and a receiver port 81 both fixed proximate to the optical switching component 40. It will be appreciated that both ports 80 and 81 are typically oriented such that each defines a line 82 and 83 in the same plane, the plane of the drawing in the case illustrated. Line 82 defined by emitter port 80 is essentially a projection of the axis along which an emitted beam would travel. Emitter port 80 is fixed such that first line 82 intersects the top surface 46 at about its center to define an angle of incidence α with the top surface 46. Likewise, line 83 defined by receiver port 81 is essentially a projection of the ideal axis along which a beam would enter receiver port 81. Receiver port 81 should be fixed such that second line 83 intersects the top surface 46 at about its center to define an angle of reflectance β with the top surface 46. Ideally, both lines 82 and 83 intersect top surface 46 at the same point.

It will be appreciated that more complex optical switches can be made of more than one emitter port 80 and more than one receiver port 81. A preferred embodiment includes one emitter port 80 and two receiver ports 81. This embodiment can switch an optical signal between either of the two receiver ports 81. It will be understood that if the angle between two receiver ports 81 is X, the top surface 46 of rotor 44 will have to traverse an angle of ½X in order to be repositioned from sending signals from one to the other. Ideally, the two receiver ports 81 are therefore situated proximate one another such that the difference X between their respective angles of reflectance β is small, thus reducing the amount of movement required of rotor 44 and, hence, time to accomplish this movement.

FIG. 8 additionally illustrates a controller 84 electrically coupled to piezoelectric actuator 45. A piezoelectric material will linearly deform along an axis in response to an electric potential applied across that axis. In preferred embodiments, piezoelectric actuator 45 includes first and second opposing sides 85 and 86 between which an electric potential is created in order to deform the actuator 45. Sides 85 and 86 can additionally include electrical contacts, for example a thin gold coating can serve both as a bonding pad for joining a wire as well as to distribute charge across the surface. In some embodiments controller 84 applies a negative charge to first side 85 and a positive charge to second side 86, in other embodiments the polarity is reversed, and in still other embodiments the stator 42 is grounded and charge of either polarity can be applied to second surface 86. In preferred embodiments the controller 84 can apply either polarity to either side 85 or 86 as needed in order to either increase or decrease the responsiveness and length of the actuator 45.

With further reference to FIG. 8, controller 84 is configured to receive input in the form of an instruction to switch a beam of light or other optical signal from an emitter port 80 to a receiver port 81. Controller 84 is further configured, preferably through a calibration process, to apply a precise voltage to actuator 45 in order to rotate rotor 44 relative to the stator 42 around an axis such that the angles of incidence α and reflectance β are substantially equal. In preferred embodiments the optical switching component 40 further comprises a detector 87 capable of determining a signal strength of the reflected beam 83 after it has entered the receiver port 81. By placing the detector 87 in communication with the controller 84 a feed-back loop can be formed whereby the controller 84 is capable of optimizing the signal strength of the reflected beam 83 at the receiver port 81 by adjusting the applied voltage to actuator 45.

It will also be appreciated that controller 84 can be configured to apply voltages to more than a single piezoelectric actuator 45. FIG. 8 shows, for instance, two piezoelectric actuators 45 set on opposite sides of rotor 44. The two actuators 45 can be coordinated by the controller 84 to cooperatively pivot the rotor 44 by having one elongate while the other contracts. It will be further appreciated that a single controller 84 can be likewise configured to coordinate any number of piezoelectric actuators 45 arranged around a rotor 44. In some preferred embodiments the controller 84 can coordinate four piezoelectric actuators 45 symmetrically arranged at approximately 90° intervals. Other embodiments involve symmetric arrangements of three and six actuators 45.

Figure 9:
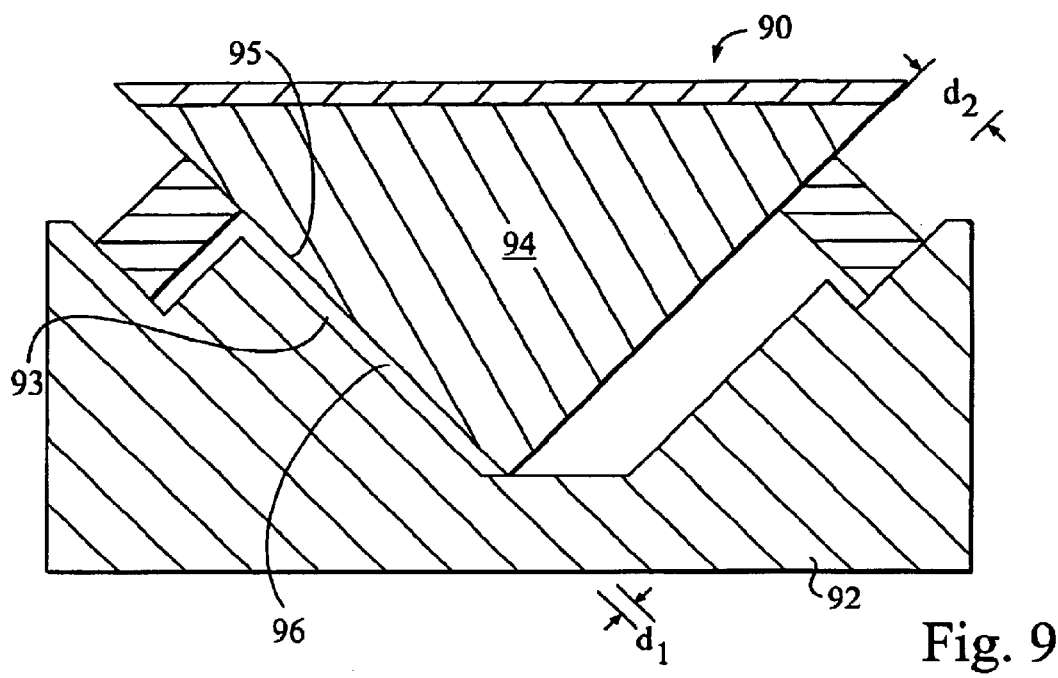
FIGS. 9 and 10 are cross-sections of optical switching components according to embodiments of the present invention.
Figure 10:
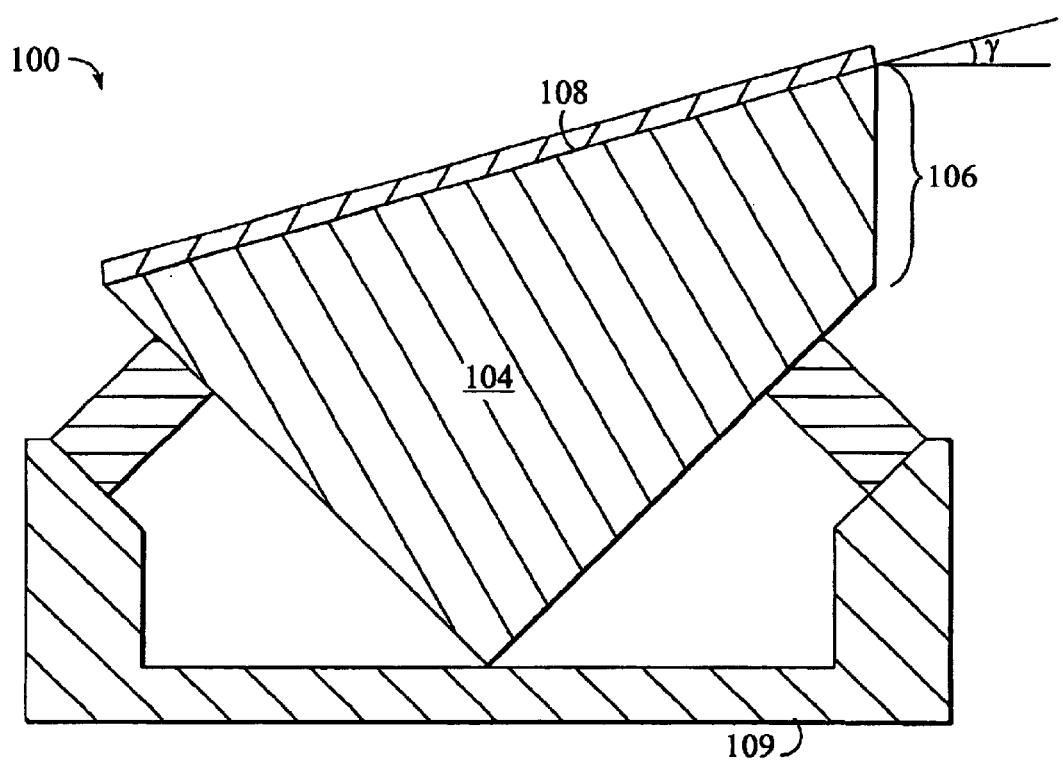

FIGS. 9 and 10 show cross-sections of further embodiments of the present invention in optical switching components 90 and 100, respectively. Optical switching component 90 comprises a stator 92 including a first limiting side 93, and also comprises a rotor 94 including a first side 95. The two sides 93 and 95 oppose one another and define a gap 96, the gap 96 serving to limit the range of travel of the rotor 94 in the direction of the first limiting side 93. FIG. 9 shows two gaps 96 having dimensions $d_1$ and $d_2$ to illustrate that the rotor 94 will have a greater range of travel as the gap 96 is increased.

It will be appreciated that although the drawings show sides 93 and 95 as substantially parallel, the present invention includes other relationships between the two sides 93 and 95. For instance, given the pivotal motion of the rotor 96 relative to the stator 92, sides 93 and 95 can be configured so that they are initially spaced at a small angle relative to one another and that the rotor 96 is pivoted towards the first limiting side 93 the two sides become substantially parallel as they meet. As another example, first limiting side 93 can further include a protrusion having a flat surface opposing first side 95. In such an embodiment the area of contact between the opposing sides 93 and 95 is limited to the surface area of such protrusion's flat surface.

FIG. 10 shows a cross-section of optical switching component 100. Optical switching component 100 comprises a rotor 104 including an angled top portion 106. The angled top portion 106 provides a pre-set tilt γ to the top surface 108, where the tilt γ can be measured as the angle between the top surface 108 and a plane defined by the stator 42. The plane defined by the stator 42 can itself be defined in many ways, but a useful definition is the plane of the bottom surface 109 of the stator 42.

FIG. 11 shows an embodiment of an optical switching device 110 comprising at least one optical switching component 40 of the present invention. FIGS. 12 and 13 show cross-sections of optical switching device 110 taken along perpendicular axes, as shown. By assembling a plurality of optical switching components 40, a device 110 can switch multiple beams simultaneously. Although a controller 84 is not shown in FIG. 11, it will be appreciated that in some embodiments each optical switching component 40 will have a controller 84 associated with it, while in other embodiments a single controller 84 can coordinate the motions of several, or all, of the optical switching components 40 of the device 110.

It will also be appreciated that optical switching components 90 and 100 can also be incorporated into optical switching device 110. In particular, in a device 110 including a large number of optical switching components 40, it can be desirable to have a tilt angle γ for those furthest from the center of the device 110. In this way the top surfaces 46 of the plurality of optical switching components 40 can collectively be made to approximate the surface of a sphere or a cylinder, for example.

Figure 14:
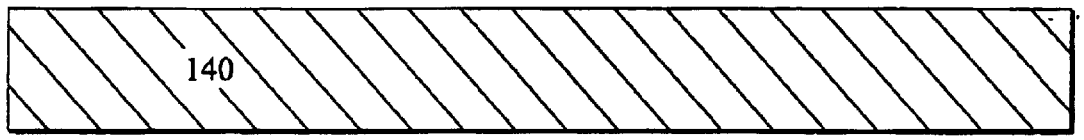
FIGS. 14–19 are cross-sections of an optical switching device during stages of fabrication according to an embodiment of the present invention.

FIGS. 14–19 illustrate in cross-section an embodiment of a method for making an optical switching component 40. FIG. 14 shows a substrate 140 from which a stator 142 can be formed. As noted above, the stator 142 can be made of many different solid materials, however silicon, both monocrystalline and polycrystalline, are preferred choices because of the well-developed technologies associated with the microfabrication of silicon structures. Other solid materials that are commonly used as substrates in microfabrication, such as certain porcelain compositions and aluminum oxide-titanium carbide composites can also be used.

Figure 15:
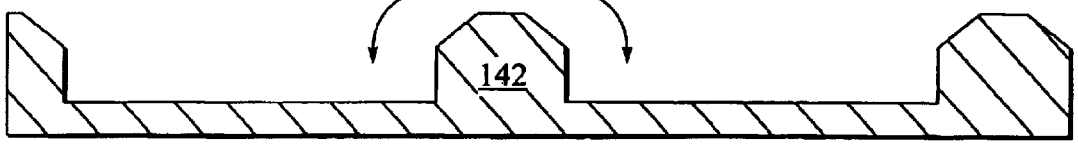

FIG. 15 shows a stator 142 formed from substrate 140. Stator 142 is fabricated by defining one or more cavities 150 into substrate 140. Cavities 150 can be defined by standard rnicrofabrication techniques such as photolithography in which successive steps of forming a mask, exposing portions of the substrate 140 left unprotected by the mask to an etching process, and stripping away the mask can be used. Etching processes can include wet chemical etches as well as gas phase etch techniques such as reactive ion etching (RIE) and plasma etching (PE). Cavities 150 can also be defined by other fabrication techniques, for example, ion milling, laser ablation, and mechanical grinding and polishing. It will be appreciated that stator 142 can also be fabricated from sheet metals by forming techniques such as stamping, and can likewise be formed from ceramics by techniques such as casting and sintering, and from plastics by techniques such as injection molding.

Figure 16:
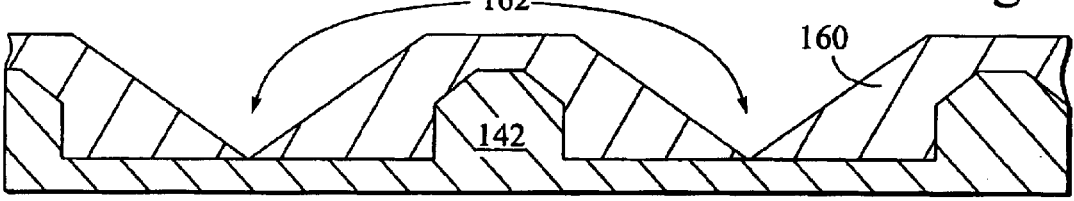

FIG. 16 shows the stator 142 with a mask layer 160 formed thereon. The mask layer 160 initially conforms to the surface of the stator 142 and fills all of the cavities 150. Ideally, mask layer 160 includes a material that is easily worked with according to common microfabrication techniques. In some embodiments the mask layer 160 is preferably formed of photoresist, but can also be formed out of other materials that are readily deposited and readily removed.

FIG. 16 additionally shows an opening 162 formed into the mask layer 160. The opening 162 can serve as a mold within which a rotor can be formed. Opening 162 can be formed by standard microfabrication techniques such as photolithography, as described above, as well as RIE, PE, ion milling, laser ablation, and mechanical grinding and polishing.

Figure 17:
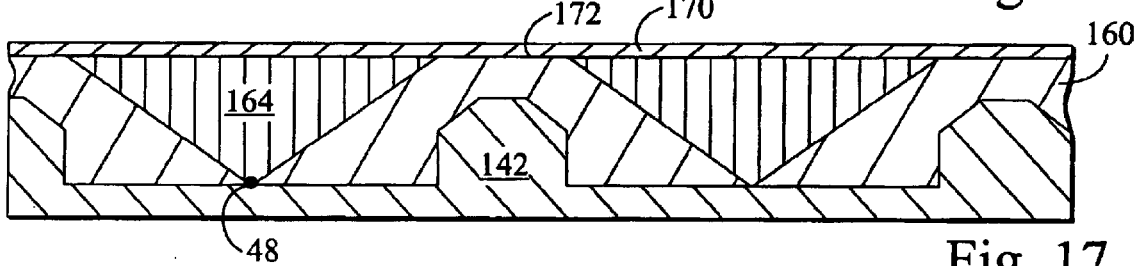

FIG. 17 shows a rotor 164 formed within the opening 162. A pivotal connection to the stator 142 can also be formed at the same time. For instance, both of the embodiments for pivot connector 48 shown in FIGS. 6 and 7 can be formed by defining the opening 162 such that it leaves a portion of the stator 142 exposed. Thus, when rotor 164 is formed the pivot connector 48 can also be formed. To form the cup and ball example provided in FIG. 5, a socket is first defined in stator 142, preferably when cavity 150 is defined. Thereafter, a very thin layer of an easily removable material is deposited within the socket. Then, the rotor 164 is formed over the very thin layer. Finally, the very thin layer is removed, for example by dissolution, to release the ball on rotor 164 from the interior of the socket in the stator 142 so the ball is free to rotate.

FIG. 17 also shows an optically reflective coating 170 formed on a top surface 172. Top surface 172 is preferably very flat over the span of the entire device being fabricated. Very flat surfaces are well known in the arts of semiconductor manufacturing, disk-drive component manufacturing, and optics, to name a few. Techniques such as lapping, polishing, and chemical-mechanical planarization (CMP) are well known in these arts and are amongst the methods suitable for forming top surface 172. Similarly, from these same arts are techniques useful for depositing optically reflective coating 170 such as evaporation, sputtering, chemical vapor deposition (CVD), molecular beam epitaxi (MBE), and the use of seed layers. It should be noted that optically reflective coating 170 can also be smoothed or planarized in some embodiments by the techniques discussed above.

Figure 18:
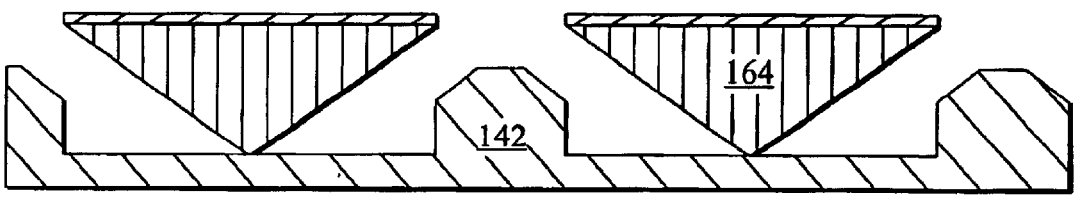

FIG. 18 shows rotor 164 formed within the opening 162 of the stator 142 after the mask layer 160 has been removed. In some embodiments it is first desirable to remove portions of the optically reflective coating 170 between the rotors 164 before removing the mask layer 160. This can be accomplished by masking and etching, for example. The mask layer is preferably removed by a wet chemical process or a gas phase reaction that can selectively remove the mask layer 160 without attacking the materials of the rotor 164 or the stator 142.

Figure 19:
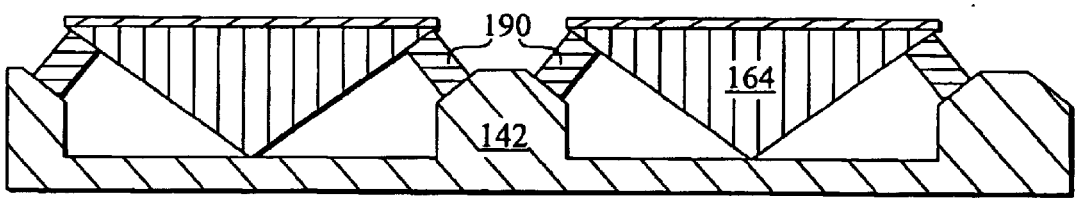

FIG. 19 shows a piezoelectric actuator 190 formed between the stator 142 and the rotor 164. In some embodiments the piezoelectric actuator 190 is manufactured separately and is mechanically inserted between the stator 142 and the rotor 164. In other embodiments the piezoelectric actuator 190 is formed in place between the stator 142 and the rotor 164. In still other embodiments the piezoelectric actuator 190 is formed in place and in contact with the stator 142 and then the rotor 164 is formed to contact the piezoelectric actuator 190. In some embodiments it is preferable to only partially remove mask layer 160 before continuing with forming piezoelectric actuator 190 between the stator 142 and the rotor 164. In other embodiments the piezoelectric actuator 190 is formed before any of mask layer 160 is removed.

In those embodiments in which the piezoelectric actuator 190 is manufactured separately and mechanically inserted into the device being fabricated, precise mechanical manipulators can be used to fit piezoelectric actuator 190 into place between stator 142 and rotor 164. For these embodiments it can be helpful to form small recesses within the stator 142 and the rotor 164 to receive the ends of the piezoelectric actuator 190.

In those embodiments in which the piezoelectric actuator 190 is formed in place between the stator 142 and the rotor 164 it can be helpful to maintain the mask layer 160, or to form a subsequent mask layer, to use as a mold within which to form piezoelectric actuator 190. Some piezoelectric materials are well suited for being formed in place, such as certain plastic piezoelectric materials. Certain ceramic piezoelectric materials can also be fabricated by techniques such as MBE and CVD. As above, it can be helpful to form small recesses within the stator 142 and the rotor 164 before forming piezoelectric actuator 190 to provide a better mechanical connection.

In those embodiments in which the piezoelectric actuator 190 is formed in place and in contact with the stator 142 before the rotor 164 is formed, openings can first be defined in mask layer 160 in which the piezoelectric actuator 190 is formed. After the piezoelectric actuator 190 is formed, an opening 162 can be defined and then rotor 164 formed therein.

In the foregoing specification, the invention is described with reference to specific embodiments thereof. It will be recognized by those skilled in the art that while the invention is described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that it can be utilized in any number of environments and applications without departing from the broader spirit and scope thereof. The specification and drawings are, accordingly, to be regarded as illustrative rather than restrictive.

What is claimed is:

1. A method for making an optical switching component comprising:

providing a substrate;

forming a stator by defining a cavity within the substrate;

forming a mask layer over the stator and filling the cavity;

forming an opening in the mask layer;

forming within the opening a rotor and a pivotal connection to the stator;

removing the mask layer; and forming a piezoelectric actuator between the stator and the rotor.

2. The method of claim 1 wherein the substrate includes silicon.

3. The method of claim 1 wherein defining a cavity is performed by photolithography.

4. The method of claim 1 wherein the mask layer includes photoresist.

5. The method of claim 1 wherein forming an opening is performed by photolithography.

6. The method of claim 1 wherein removing the mask layer is performed by wet chemical etching.

7. The method of claim 1 wherein forming a piezoelectric actuator is performed before forming a rotor.

8. The method of claim 7 wherein forming a piezoelectric actuator is performed by a deposition process.

9. The method of claim 1 wherein forming a piezoelectric actuator is performed by a mechanical process.

10. The method of claim 1, further including forming an optically reflective surface on the rotor.

11. The method of claim 1, wherein forming the piezoelectric actuator includes manufacturing the piezoelectric actuator separately and inserting the piezoelectric actuator between the stator and the rotor.

12. The method of claim 1, wherein forming the piezoelectric actuator occurs prior to removing the mask layer.

13. A method for making an optical switching component comprising:

providing a substrate;

forming a stator from the substrate by defining a cavity within the substrate;

forming a mask layer over the stator, the mask layer filling the cavity;

forming an opening in the mask layer;

forming within the opening a rotor and a pivotal connection between the rotor and the stator;

removing the mask layer; and forming a piezoelectric actuator between the stator and the rotor.

* * * * *